United States Patent [19]

Gieseking

[11] 4,243,260
[45] Jan. 6, 1981

[54] CONVERTIBLE BED FOR PICK-UP TRUCK CAMPER OR THE LIKE

[76] Inventor: Darrell Gieseking, 119 Scott, St. Louis County, Mo. 63135

[21] Appl. No.: 60,486

[22] Filed: Jul. 25, 1979

[51] Int. Cl.³ .............................................. B60P 3/32
[52] U.S. Cl. .................................. 296/24 R; 5/10 B; 5/118
[58] Field of Search ..................... 296/170, 174, 24 R; 5/9 R, 9 B, 118, 10 B

[56] References Cited

U.S. PATENT DOCUMENTS

| | | | |
|---|---|---|---|
| 2,592,924 | 4/1952 | Lyon | 5/10 B |
| 2,673,353 | 3/1954 | Dean | 5/9 R |
| 3,266,062 | 8/1966 | Rogers | 5/118 |
| 3,874,009 | 4/1975 | Nosaka | 296/24 R |

*Primary Examiner*—Robert R. Song

*Attorney, Agent, or Firm*—Kalish & Gilster

[57] ABSTRACT

In a vehicle such as a pick-up truck having a camper top defining, with the load bed, a compartment including a ceiling and opposite side walls, a convertible bed is provided having a plurality of sections in hinged end-to-end relationship. A pair of track members are mounted on the side walls of the camper top and have channel configuration. Guide rollers are carried by the bed sections at their opposite sides for guiding movement of the sections along the track members. The pair of track members lie in parallel planes, each defining a track having a first reach proximate the ceiling of the camper top, a lower reach lowered from the ceiling and extending above the truck bed, and a further curvilinear reach joining the upper and lower reaches. The bed is selectively moveable along each track between a storage position proximate the ceiling and a use position lowered from the ceiling.

9 Claims, 6 Drawing Figures

CONVERTIBLE BED FOR PICK-UP TRUCK CAMPER OR THE LIKE

BACKGROUND AND SUMMARY OF THE INVENTION

The present invention relates to a convertible bed and more particularly one which is suitable for installation in a pick-up truck camper top.

Pick-up trucks are sometimes provided with shelter units or so-called camper tops which provide, with the load bed of the truck, a compartment useful for carrying cargo as well as providing a sheltered place in which to sleep. Heretofore, to sleep in the compartment, it has been typical to remove or clear cargo, tools, and various materials which are stored in the camper top in order to have a place in which to stretch out for sleeping. Alternatively, a bed board can be assembled which covers some of the cargo stored in the bed. In either event, it is inconvenient to utilize the camper top compartment for both carrying of cargo and sleeping.

It would be more desirable if a convertible bed could be utilized which would be stored in an out-of-way position so that full access to the load bed of the truck could be had for carrying cargo and otherwise making conventional use of the truck, yet the bed could be quickly placed in use position.

An object of the present invention is the provision of an improved convertible bed for vehicle.

A further object of the invention is the provision of such a convertible bed which is particularly suited for installation and use in camper top-equipped pick-up trucks or other recreational vehicles, and which conveniently may be installed on the vehicle as added equipment after manufacture of the vehicle.

Another object of the invention is the provision of such a convertible bed which permits the bed to be stored in the vehicle in a completely out-of-way location to permit unencumbered access to cargo in the vehicle as well as routine hauling and load storage of items in the vehicle.

Yet another object of the invention is the provision of such a convertible bed which can be deployed from its stored position and ready for use in an extremely facile and quick manner, and which similarly may be rapidly and conveniently returned to its storage position.

A further object of the invention is the provision of such a convertible bed which, in the use position, does not interfere with or require removal of cargo which is carried within the vehicle, such as the load bed of a pick-up truck.

A still further object of the invention is the provision of such a convertible bed which, when occupying its stored position, presents a cushioned surface at the top of the camper top or other vehicle in which the bed is installed to protect persons, animals, or cargo which are carried in the vehicle.

An additional object of the invention is the provision of such a convertible bed which is very easily and quickly installed within the vehicle without requiring special tools or equipment, and which does not require the use of more than common, ordinary mechanical skills, being of a configuration permitting the owner or user of a vehicle to quickly and simply install the unit in a short time.

Among still further objects of the invention may be noted the provision of such a convertible bed which is constructed of relatively few, inexpensive and widely available hardware and materials; which is simple and foolproof in operation; which is low in initial cost; and which is rugged and durable in use.

Other objects will be in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
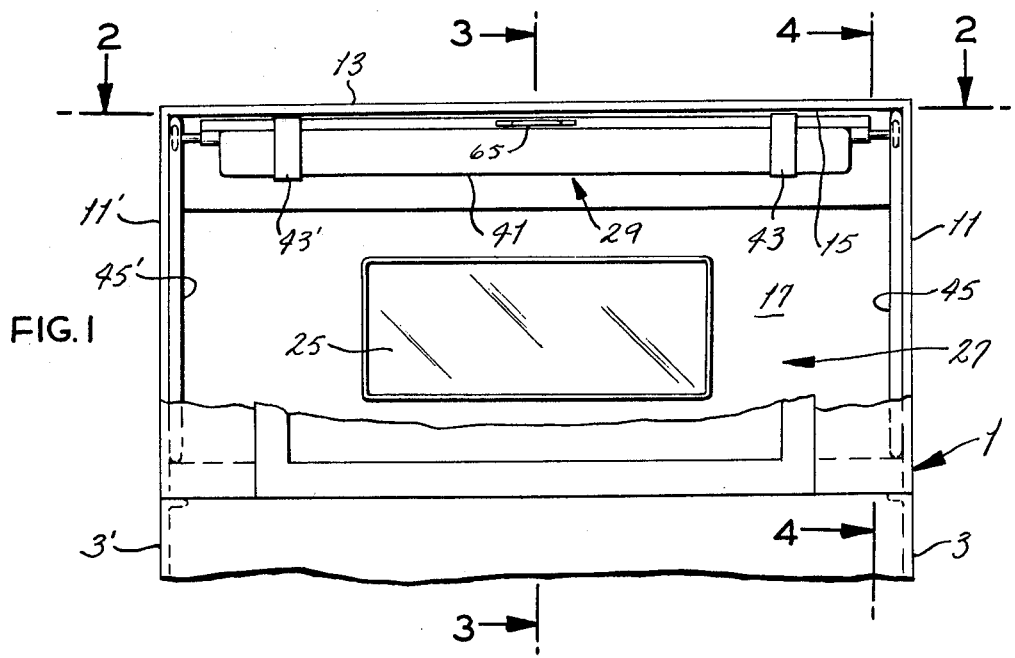
FIG. 1 is a rear elevational view of a pick-up truck camper top fitted with a convertible bed constructed in accordance with and embodying the present invention.

Referring now to the drawings, designated generally at 1 is a pick-up truck camper top which is mounted upon the side walls 3,3' of the load bed 5 of a pick-up truck 7 (See FIG. 3) as by being secured to the side walls 3,3' of the truck bed. The usual flat or ribbed metal floor 9 of the truck bed extends between the side walls.

Camper top 1 is assumed to be of conventional commercial design, having vertical side walls 11,11' which extend upwardly beyond the respective bed walls 3,3'. A single or double roof wall 13 extends across the top to provide the camper top with a ceiling 15. At the forward end, a front wall 17 closes the camper top, there being an opening 19 at the rear wall having a smaller door. For simplicity, opening 19 is not shown to be closed but is shown to have, at opposite sides, vertical supports 21,21'.

Windows, as shown at 23,25 may be provided in the side and front walls of the camper top which will thus be seen to provide, with the truck bed floor 9 and load bed walls 3,3', a compartment 27 for receiving and hauling various kinds of cargo such as camping gear, tools, materials and small items placed upon floor 9.

Figure 3:
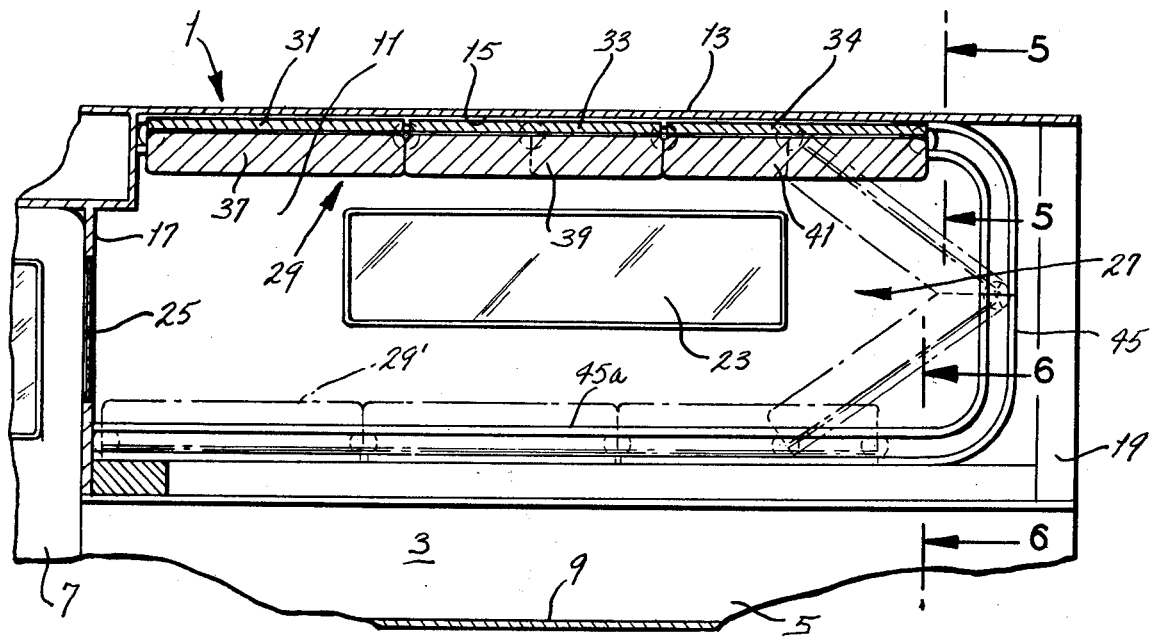
FIG. 3 is a longitudinal transverse cross-sectional view taken generally along line 3—3 of FIG. 1, illustrating also portions of a pick-up truck carrying the camper top.

In accordance with the invention, installed within camper top 1 is a convertible sleeping bed designated generally 29. The bed, as depicted in FIGS. 1 and 3, is shown in a storage position proximate the ceiling. It may be quickly and easily moved from the storage position to a use position in which it can be used for sleeping and yet without interfering with cargo or other items on the floor 9.

Convertible bed 29 is comprised of three rectangular boards or sections 31, 33 and 34, preferably of plywood for strength, which are hinged together at their ends by hinges 35 and 36,36' at the center and right and left edges of the boards.

Secured, as by strap fasteners, to a body supporting surface of each of the latter boards are separate cushions 37, 39 and 41, and there may be straps as indicated at 43,43' which extend longitudinally across all of the cushions at opposite sides, which straps are secured at their ends to the two end boards 31, 34 of the bed. Such straps, which are optional, facilitate movement of the bed and additionally to retaining the cushions in place when the bed is in the storage position, wherein it will be seen (FIG. 3) that the cushions face downward toward the floor 9 of the truck bed.

Roller guides to be described below are carried at opposite side edges of the support boards 31, 33 and 34 and are guided by U-shaped channels or guides 45,45' mounted upon the respective side walls 11,11' of the camper top.

Figure 4:
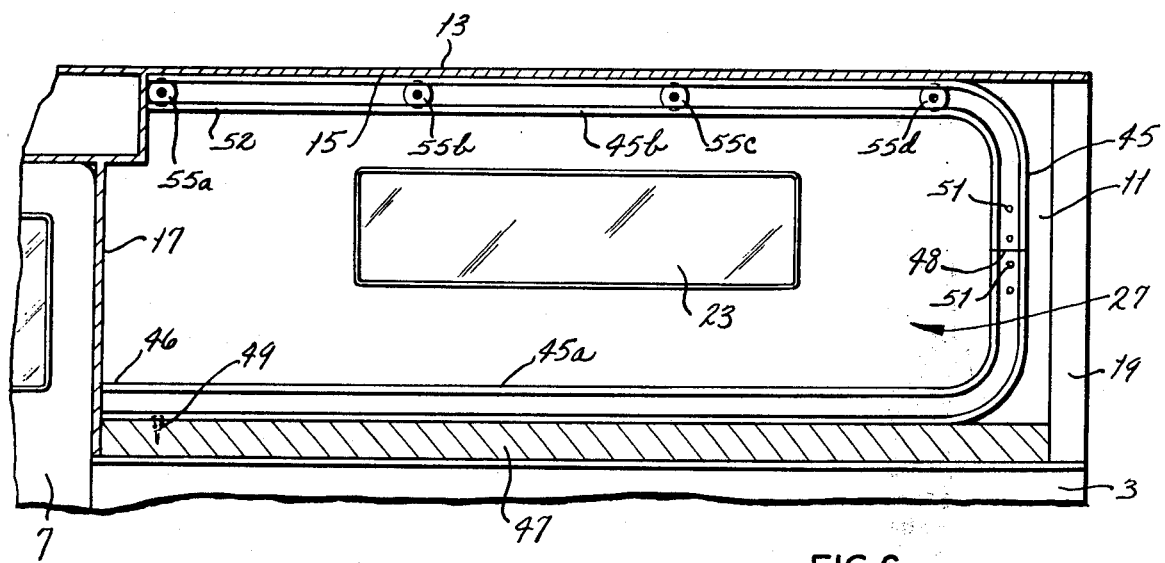
FIG. 4 is a view similar to FIG. 3 showing portions of apparatus used in installing the new convertible bed, but not showing the convertible bed.

Each of the guides 45,45' is of the same form so that it is sufficient to describe only guide 45. Referring to FIG. 4, guide 45 is comprised of two L-shaped sections 45a,45b, being each of C-shaped channel cross-section, as apparent from FIGS. 5 and 6.

The lower section 45a is secured at its remote end 46 to a wooden framing member 47 of the camper top as by means of one or more screws 49 extending downwardly through a lip of the channel material, although the same may instead be secured to side wall 11. The lower section curves upwardly from frame member 47 and the opposite end is butted, as at 49 (FIG. 4) against the corresponding end of upper section 45b. The butted ends are secured, as by bolts indicated at 51, to the side wall 11.

Similarly, the remote end 52 of upper section 45b is secured to ceiling 15, as by a bolt 53 extending through the lip of channel material and thence through the roof. However, securement of this remote end 52 to side wall 11 may be by screws or bolts.

Figure 2:
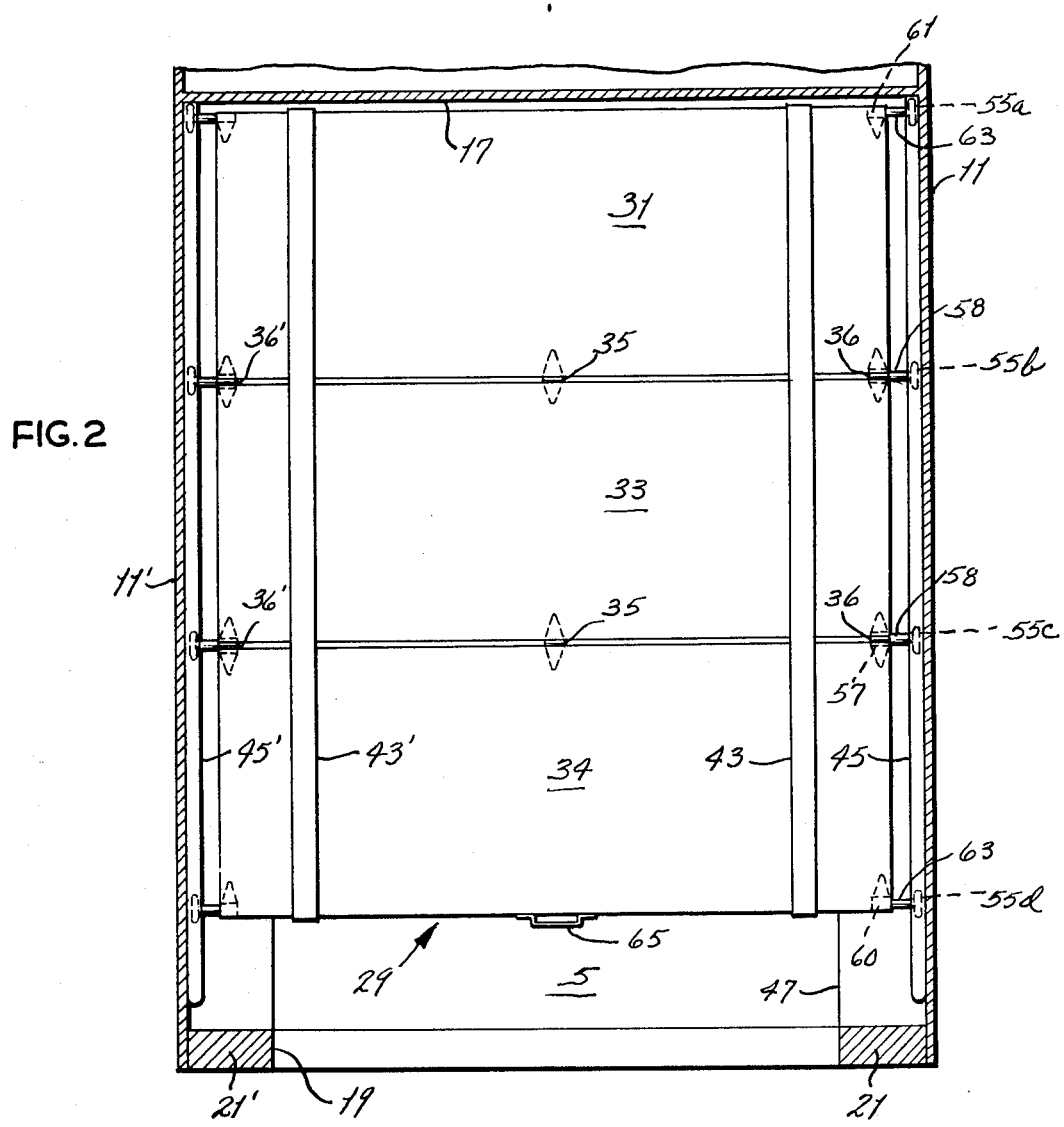
FIG. 2 is a horizontal transverse cross-sectional view taken generally along line 2—2 of FIG. 1.
Figure 5:
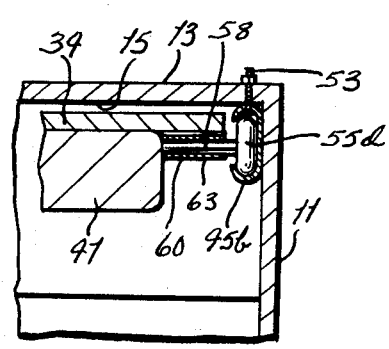
FIG. 5 is a fragmentary rear cross-sectional view taken generally along line 5—5 of FIG. 3 and showing a bed support and mounting features when in a stored position.
Figure 6:
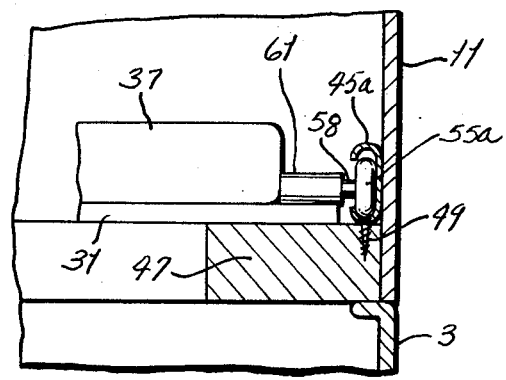
FIG. 6 is a fragmentary rear cross-sectional view taken generally along line 6—6 of FIG. 3 and showing a bed support and mounting features when in a use position.

A plurality of rollers 55a,55b,55c and 55d are carried along each side of the bed for supporting the boards 31, 33 and 34 by securement to hinges thereof in the manner shown in FIGS. 2, 5 and 6. Each side hinge has a central sleeve 57 defining a hinge axis. The sleeve receives shaft 58 upon which is journalled for rotation the respective roller, e.g., rollers 55b,55c.

Similarly, at the end sections of the bed are provided securement devices, as indicated at 60,61, which are in the nature of half-hinges defining sleeves, as at 63 (FIG. 5) for receiving a roller shaft 58 having a respective roller, which is rotatably carried at its extremity.

Since the rollers at each side of the convertible bed are, at all times, located within the respective U-shaped guides 45,45', the bed is guided for movement within the guides by rolling engagement of the rollers therein.

As will be readily apparent from FIGS. 3 and 4, the channel sections or guides thus each define a track member for guiding movement of convertible bed 29 between its storage position, as shown in FIG. 3, and its use position, as outlined in phantom at reference numeral 29' in FIG. 3. The track thus defined is observed to have a horizontal upper reach along ceiling 15, whereby the bed when in the storage position, lies closely and proximately against the ceiling where it does not at all interfere with normal loading and usage of the load bed floor 9 or carrying and movement of passengers therein. Further, when thus stored, the bed cushions act to protectively cushion and protect persons and objects against striking the ceiling.

The lower channel section 45a of each guide defines a lower reach of the track in which convertible bed 29 is supported just above the upper edges of the load bed walls 3,3' in horizontal body-supporting position for comfortable, convenient use. It is noted that considerable space remains available beneath the bed for continued storage of cargo and other items.

Movement between the parallel upper and lower reaches is along a curvilinear reach defined by the butted, affixed ends of the upper and lower track members 45a,45b. To assist in manually moving the bed between these two positions, a handle 63 is provided on the rear end edge of board 34 whereby the bed may be especially conveniently pulled down from its storage position.

Movement from storage to use position is illustrated in FIG. 3 wherein it is apparent that the bed doubles, in effect, back over itself for storage. Also, it is manifest that the vertical spacing between the upper and lower track reaches is the same or somewhat greater than the length of each of the boards or bed sections 31, 33 and 34.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What I claim and desire to be secured by U.S. Letters Patent is:

1. In a vehicle having a compartment including a ceiling and opposite walls, a convertible bed having a plurality of sections in hinged end-to-end relationship, a pair of track members on said walls, guides carried by said bed at the sides of said sections for guiding movement of said sections along said track members, said track members lying in parallel planes and each defining a track having a first reach proximate said ceiling, a lower reach lowered from said ceiling, and a further reach joining said upper and lower reaches, said bed being selectively movable along each track between a storage position proximate said ceiling and a use position lowered from said ceiling.

2. Apparatus according to claim 1, said opposite walls being vertical side walls of said compartment, said track members lying in parallel planes and affixed to said side walls.

3. Apparatus according to claim 2, said vehicle being a truck having a load bed having a floor and opposite load bed walls extending upward from said floor, said vehicle including a load bed cover having said side walls and a top wall extending between said side walls and defining said ceiling, said convertible bed sections extending widthwise between said side walls, said sections together defining a body support surface of said convertible bed, said body support surface facing toward said floor when said convertible bed is in said storage position and toward said ceiling when in said use position.

4. Apparatus according to claim 3, the lower track reach of each said track member being located above said load bed walls, said bed sections when in said use position lying above said load bed walls to provide useable space between said sections and said floor.

5. Apparatus according to claim 3, said sections each carrying a cushion upon said body support surface, means securing said cushions to the respective sections, said cushions facing toward said floor when said sections are in said storage position whereby said ceiling is cushioned by said cushions.

6. Apparatus according to claim 2, said upper reach being parallel to said lower reach, said further reach being curvilinear whereby said upper, lower and further reaches together define a U-shape, said upper and lower reaches having a vertical spacing between them which is at least as great as the length of any of said sections.

7. Apparatus according to claim 6, said track members each comprising a pair of L-shaped channels, each L-shaped channel having a long side and a short side, L-shaped channels being adapted for being secured to said vertical side walls to provide a continuous channel-form track in each side wall with said short sides of each pair constituting said further reach.

8. Apparatus according to claim 6, said track members being of channel-section configuration to define channels on each side wall opening toward the opposite side wall, said guides comprising a plurality of rollers received within the respective channels.

9. Apparatus according to claim 8, said sections being secured together by a pair of hinges and opposite sides thereof, said hinges having a hinge sleeve defining a hinging axis, each said sleeve receiving a roller shaft, each of said rollers being carried by a respective roller shaft, two of said sections being end sections defining the opposite ends of said convertible bed, end sleeve means located at said opposite ends for receiving a pair of roller shafts at opposite sides of the respective end sections, roller shafts in the respective end sleeves, and rollers on said roller shafts and received within the respective channels of said track members for supporting the ends of said convertible bed.

* * * * *